July 11, 1939.  F. L. FULLER  2,165,248
CASH REGISTER
Filed June 26, 1936    11 Sheets-Sheet 1

INVENTOR
Frederick L. Fuller
BY
ATTORNEY

July 11, 1939.  F. L. FULLER  2,165,248

CASH REGISTER

Filed June 26, 1936 11 Sheets-Sheet 2

INVENTOR
Frederick L. Fuller
BY
W. M. Wilson
ATTORNEY

July 11, 1939. F. L. FULLER 2,165,248
CASH REGISTER
Filed June 26, 1936 11 Sheets-Sheet 3

INVENTOR
Frederick L. Fuller
BY
ATTORNEY

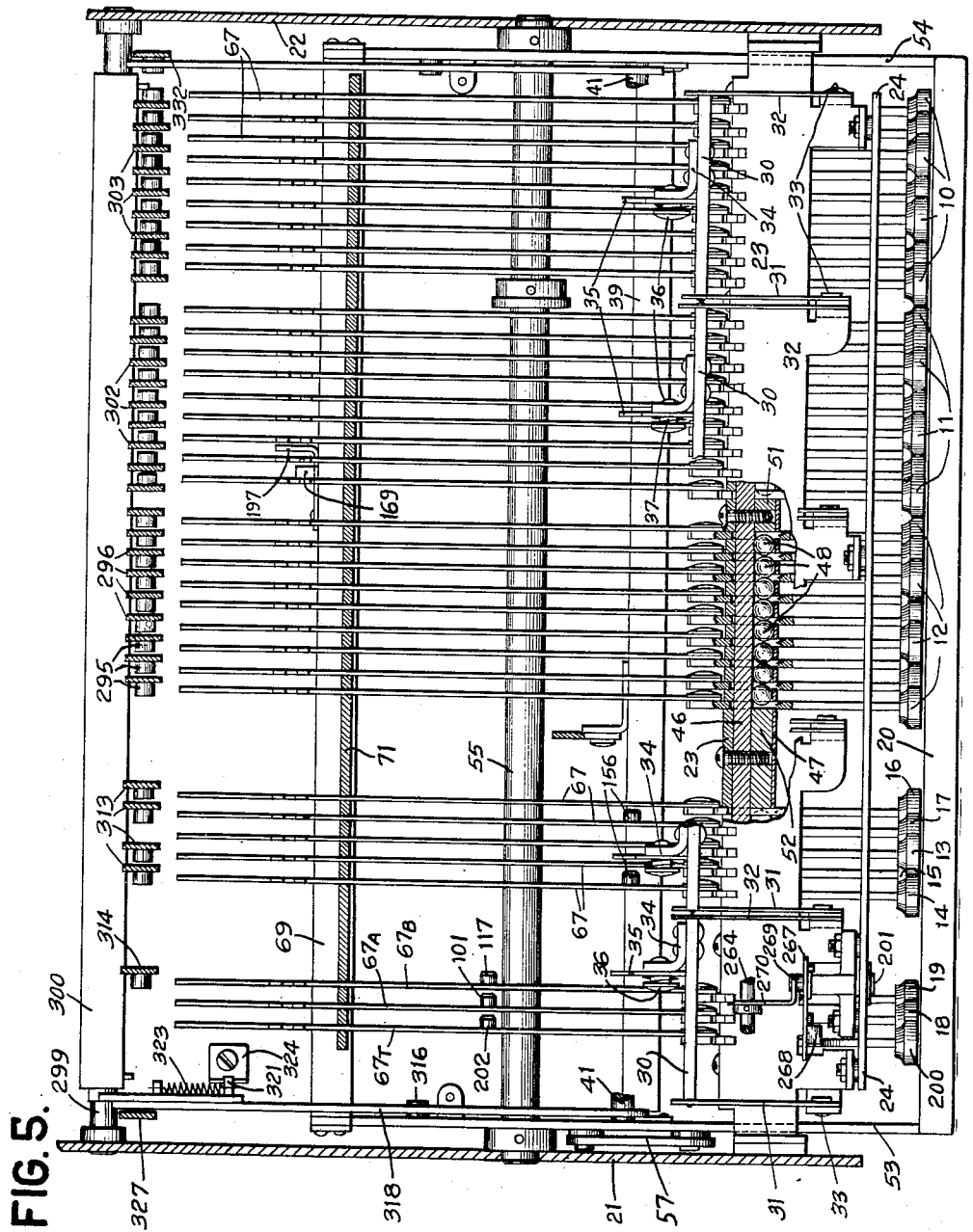

July 11, 1939.  F. L. FULLER  2,165,248

CASH REGISTER

Filed June 26, 1936  11 Sheets-Sheet 5

INVENTOR
Frederick L. Fuller
BY
ATTORNEY

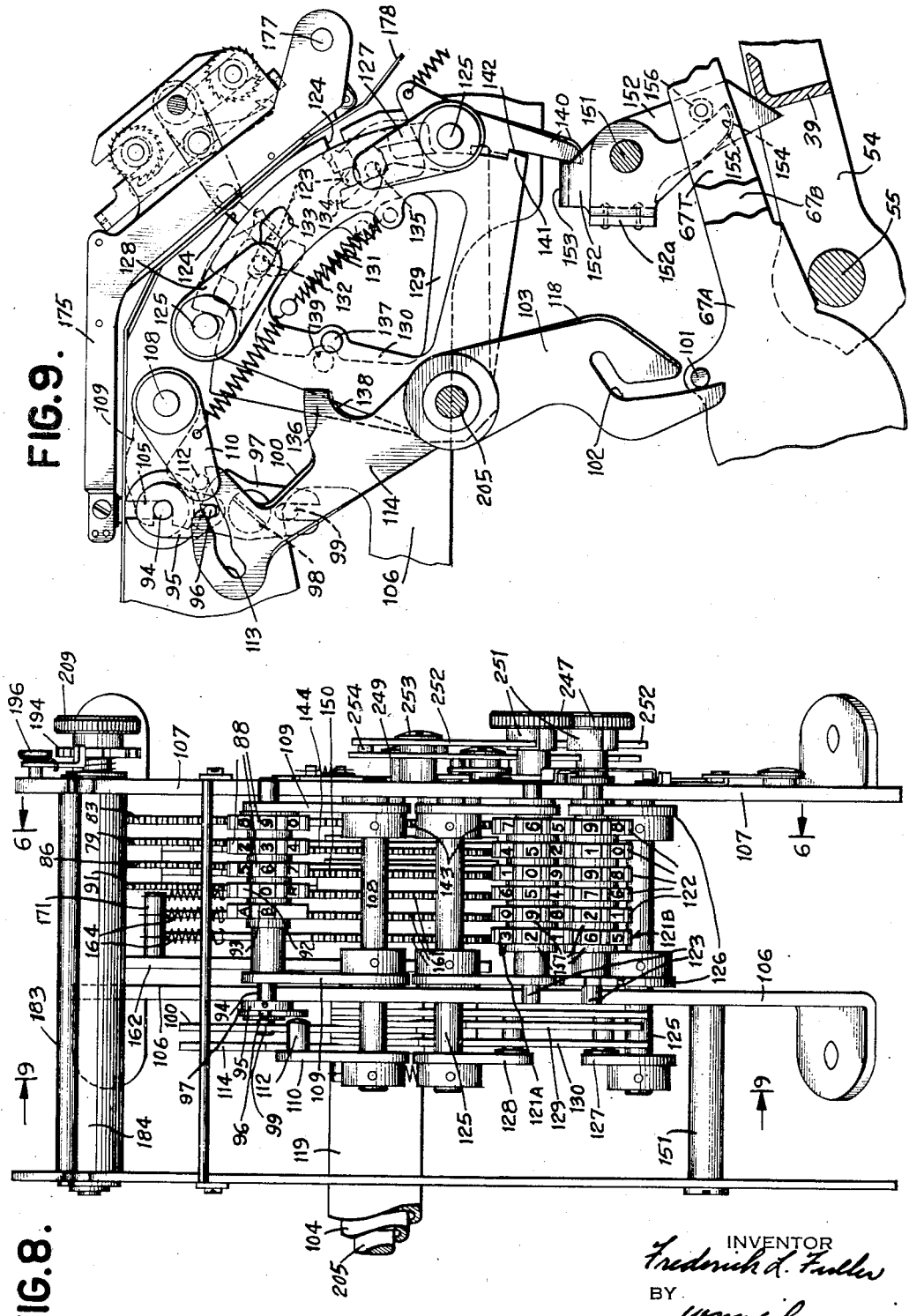

July 11, 1939.   F. L. FULLER   2,165,248
CASH REGISTER
Filed June 26, 1936   11 Sheets-Sheet 7
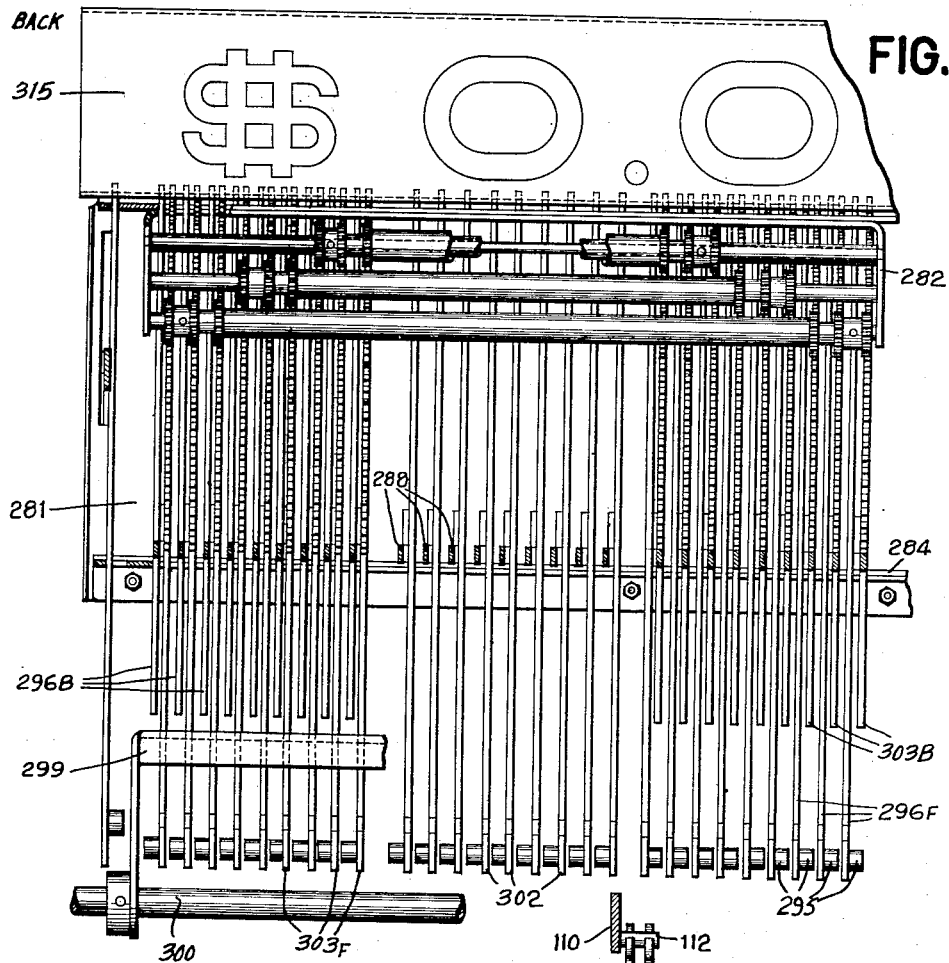
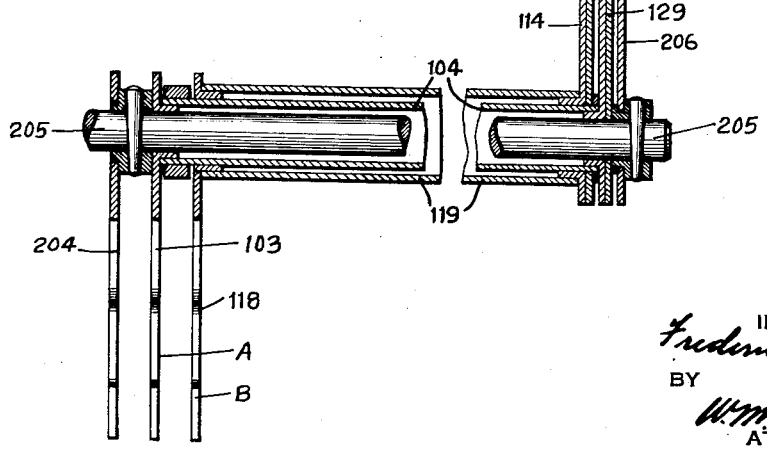
INVENTOR
Frederick L. Fuller
BY
ATTORNEY July 11, 1939.    F. L. FULLER    2,165,248
CASH REGISTER
Filed June 26, 1936    11 Sheets-Sheet 8
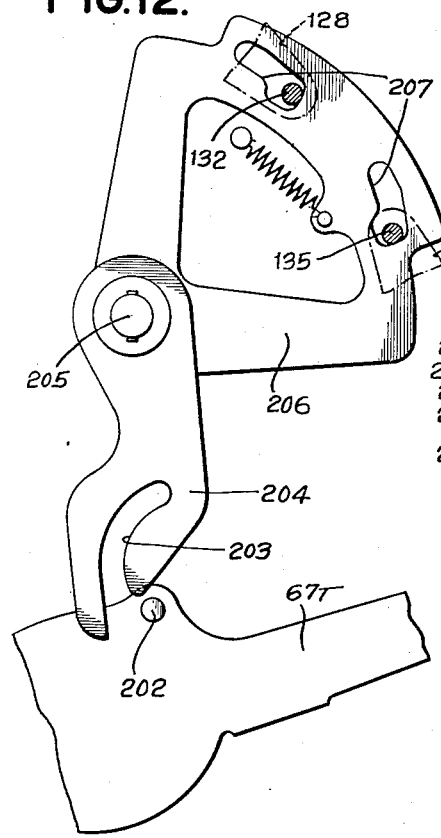
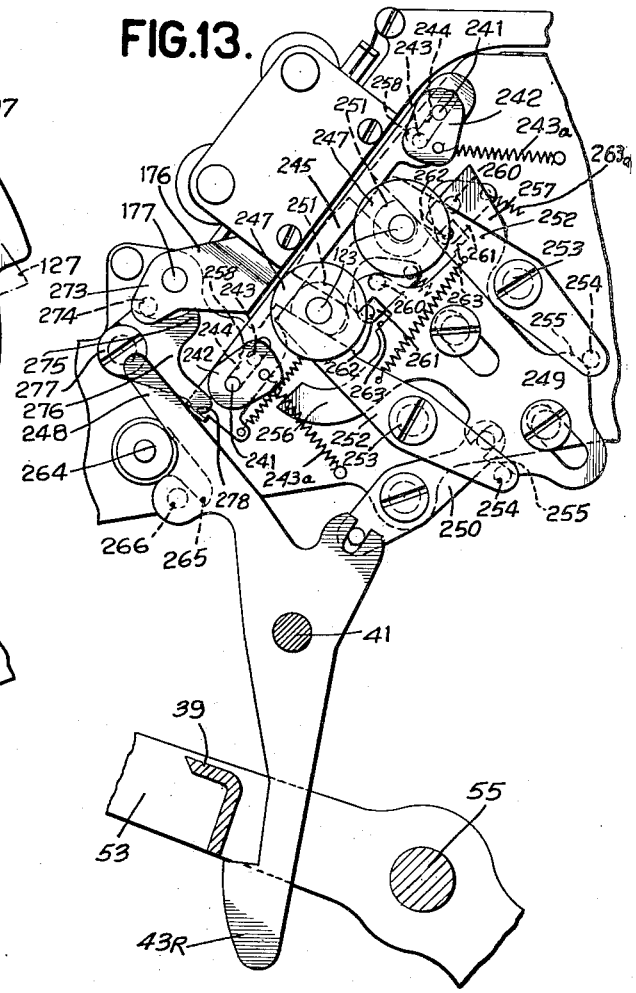
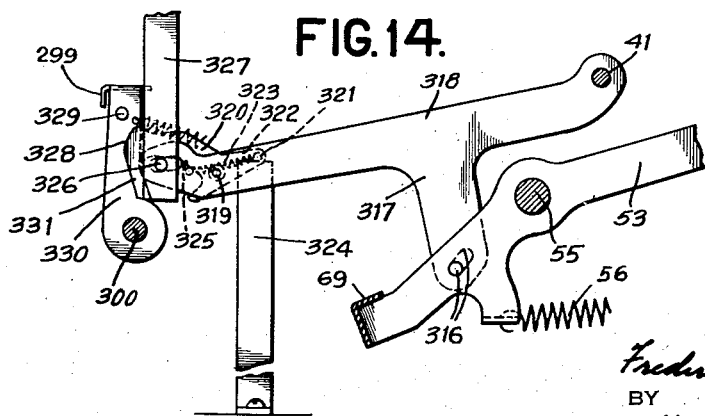
INVENTOR
Frederick L. Fuller
BY
ATTORNEY July 11, 1939. F. L. FULLER 2,165,248
CASH REGISTER
Filed June 26, 1936 11 Sheets-Sheet 9
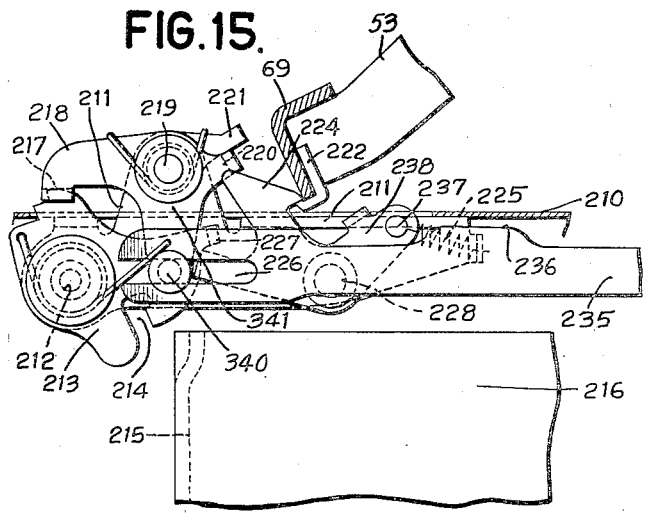
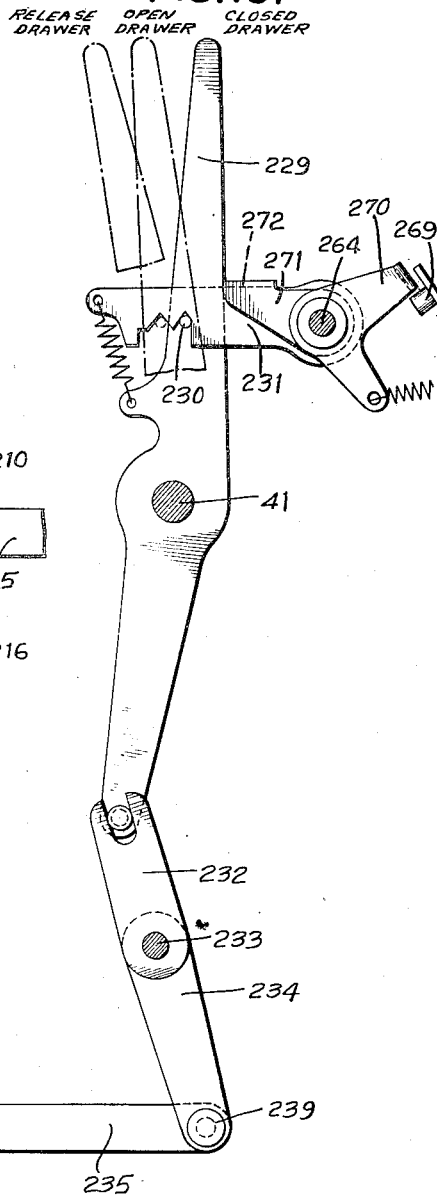
INVENTOR
Frederick L. Fuller
BY
ATTORNEY

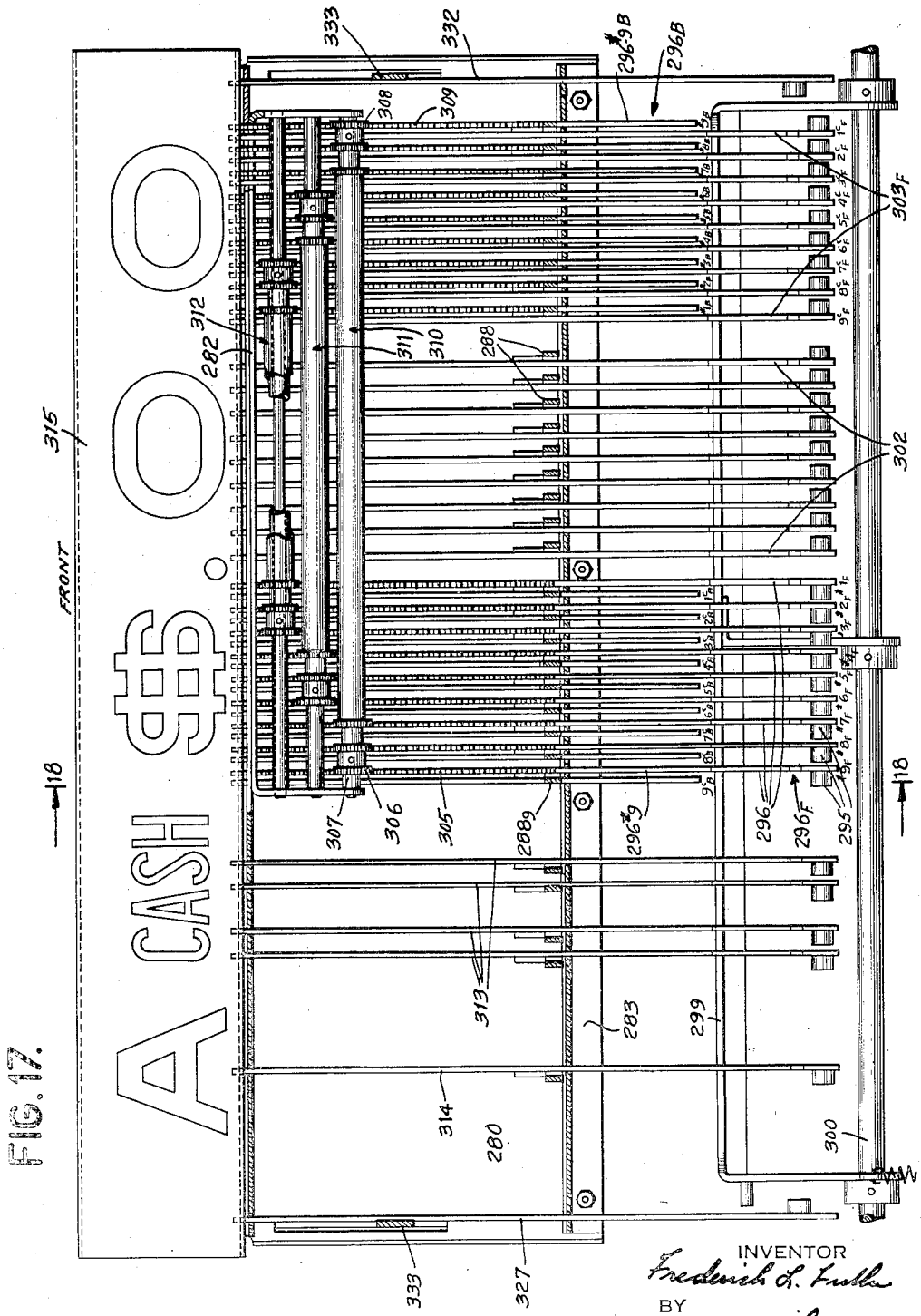

July 11, 1939.     F. L. FULLER     2,165,248
CASH REGISTER
Filed June 26, 1936     11 Sheets-Sheet 11
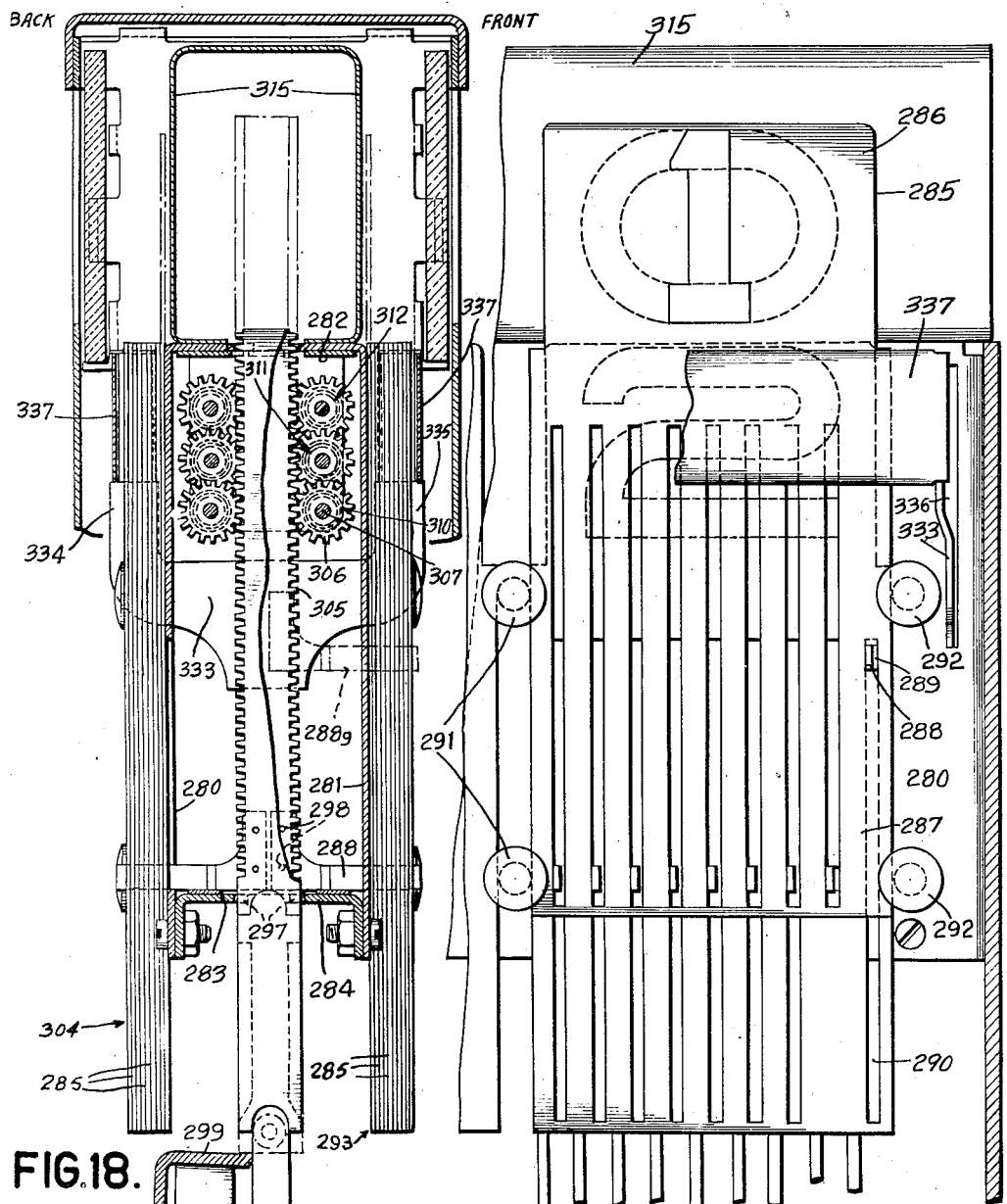
FIG.18.
FIG.19.
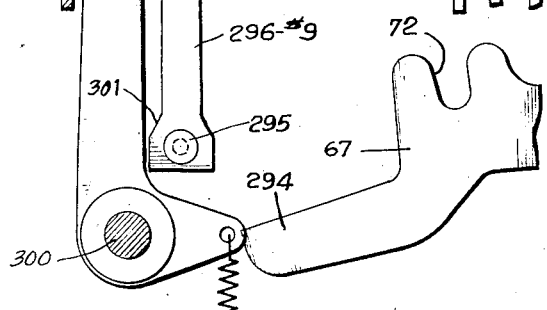
INVENTOR
Frederick L. Fuller
BY
ATTORNEY Patented July 11, 1939

2,165,248

UNITED STATES PATENT OFFICE 2,165,248

CASH REGISTER

Frederick L. Fuller, West Orange, N. J., assignor to International Business Machines Corporation, New York, N. Y., a corporation of New York Application June 26, 1936, Serial No. 87,333

7 Claims. (Cl. 235—8)

This invention relates to improvements in cash registers and more particularly to improvements in certain mechanisms hereinafter referred to.

One of the objects of the invention is to devise a cash register which will have the advantages of both the key set and key operated types. One advantage of the key set type over the key operated type is that the keys can be depressed preliminary to an operation of the machine by a single finger permitting the operator to be free to hold the articles purchased or the money received and making it possible to control the entry of amounts of high denominations. This and other advantages of the key set type of machine are inherent in the key construction of the present invention. The advantage of the key operated machine is that a single stroke of a key will effect the operation of the machine and this in the present case is effected by a bar positioned exteriorly of the machine and operable manually with facility and ease.

Another object of the present invention is to devise an improved form of differential mechanism comprising a series of differentially cam slotted plates which are individually selected for operation by the keys and are operated individually with respect to the series. Heretofore such constructions usually necessitated the movement of all the cams in a series which created a hard key operation and resulted in a construction which was expensive to make and difficult to maintain in service. By the present construction each key couples a related key cam to the main operating member to cause the operation of that key cam alone.

Another object of the invention is to provide an improved machine containing a single actuating mechanism and a plurality of independently actuated totalizers any one of which is capable of preliminary adjustment to establish a cooperative relationship between a totalizer and the common actuating mechanism, and more particularly to provide improved mechanism to cause the selection to be effected by the depression of the clerk's keys.

A further object in connection with the totalizer selection is to provide an improved "totalizer throwout" mechanism by means of which certain transaction keys prevent the selected totalizer from being actuated.

In connection with the printing mechanism an object of the machine is to devise a printing mechanism which is capable of printing the amount of the transaction, the type of transaction and the clerk making the transaction on a record strip.

A still further object is to provide a simple means for printing the totals standing on the totalizers on the record strip.

A still further object is to provide an arrangement which permits the use of type wheels with characters in non-reversed order to print upon a record strip without direct contact between the type wheels and the inking ribbon which permits the type wheels to be kept clean for repeated printing impressions.

A still further object of the invention is to devise an improved construction which prevents any attempt on part of a clerk to fraudulently change the totalizer settings through the raising of a platen carrying frame which gives direct access to the totalizer wheels.

A still further object of the present invention is to provide an improved form of indicating mechanism and indicator selecting mechanism and to arrange the group of indicators within the machine and to operate them in such a manner that the amount of the transaction, the type of transaction and the clerk's indicator will be rendered visible from both sides of the machine, and the amounts exhibited in correct denominational order.

More specifically it is an object of the present invention to provide an indicating mechanism consisting of tablets and an improved selecting mechanism which will cause the elevation in each set of tablets of only the tablet desired to be exhibited.

A still further object of the invention is to provide the machine with a cash drawer and a means for releasing it during an operation of the machine.

A still further object is to devise a control lever with suitable connections for causing the machine to be operated in two different manners, (1) with the drawer closed before the machine can be operated or (2) to operate the machine irrespective of the position of the cash drawer, and also (3) to release the cash drawer without effecting a machine operation.

It is among the objects of the present invention to combine the various locking features which heretofore have comprised separate devices under control of separate locks, in one common device controlled by a single lock. This device controls the printing of the totals, the resetting of the totalizers, and the position of the control lever. This dispenses with the necessity of a number of controls and separate locks, together with multiplication of numerous small parts of the machine.

In said drawings:

Fig. 5 is a longitudinal sectional view of the machine.

Fig. 8 is a plan view of the unit which supports the item printing wheels, the two printing totalizers and the selecting means therefor.

Fig. 9 is a view in side elevation and is taken on the line 9—9 of Fig. 8.

Fig. 10 is a view in side elevation taken on the line 10—10 of Fig. 2 showing some of the operating connections for the indicating mechanism.

Fig. 11 is a detail view in section showing the shaft and tube line as the means of connection for certain parts.

Fig. 12 is a detail view in side elevation showing the key controlled means for effecting the printing from the two printing totalizers.

Fig. 13 is a view in side elevation showing the reset control lever and the locking devices for the totalizer wheels to prevent their improper settings when the platen carrying frame is elevated.

Fig. 14 is a detail view in side elevation showing the preferred means for raising a flash indicator.

Fig. 15 is a detail view of the drawer release mechanism and the locking device for locking the machine when the drawer is opened and shown in operated position.

Fig. 16 is a detail view of the drawer release mechanism, and the associated control lever for releasing the cash drawer and determining the manner of machine operation.

Fig. 17 is a view in front elevation of the indicating mechanism and is taken on the line 17—17 of Fig. 2.

Fig. 18 is a sectional view taken on the line 18—18 of Fig. 17 and on an enlarged scale.

Fig. 19 is an enlarged detail view of the indicating mechanism.

*Manipulative entry control devices*

Figure 1:
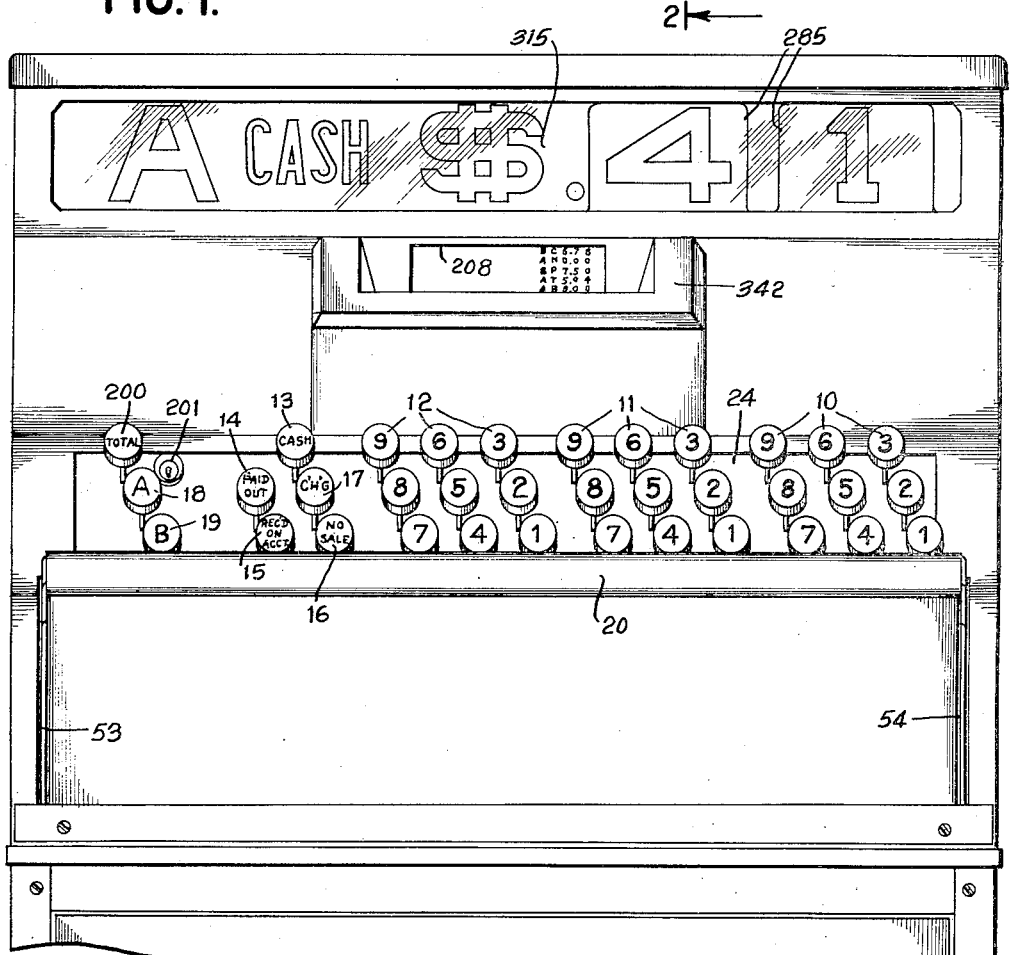
Fig. 1 is a front view of the exterior of the machine.

The machine includes three denominational groups of amount keys, shown best in Fig. 1, the numeral 10 designating the group for entering cents, numeral 11 designating the group for entering dimes, and numeral 12 designating the group for entering dollars.

In addition to these keys there is a key 13 designated "Cash," a key 14 designated "Paid out," a key 15 designated "Rec'd on acct.", a key 16 designated "No sale" and a key 17 designated "C'h'g." This group of keys comprises the transaction control keys.

For the selective entry of amounts according to a clerk's classification there is provided an "A" clerk's key 18, and a "B" clerk's key 19.

The keys of the groups of amount keys are depressed according to the amount to be entered, the clerk's keys according to which clerk enters the amount and the transaction keys according to the type of transaction, as is well known and understood.

Each of the keys selected for operation is manually depressed prior to an operation of the machine which is effected by a transverse operating bar 20 and a key is locked in its depressed position by a construction now to be explained in detail for the group of dimes keys 11, although it is to be understood that a similar construction is utilized for the other groups of keys.

Suitably attached to the left side frame plate 21 and the right side frame plate 22 (Fig. 5) is a U-shaped plate 23 to which is attached a transverse cover plate 24 (Figs. 4 and 5) for the groups of keys. The keys in each line from front to back are off-set laterally as shown in Fig. 1 to provide for a convenient manual manipulation and to also permit the lateral spacing of their respective operating members, to be referred to in detail hereinafter. The stem of each key passes through a related slot in the cover plate 24 and is further guided by a slot 25 (Fig. 4) in the U-shaped plate 23. With the exception of the center key of a single line the key stem is also guided by slots 26 and 27 in the U-shaped plate 23. Each key is held in its normal outward position by a related spring 28 (Fig. 4) but when a key is depressed inwardly a notch 29 (Fig. 4) thereof is caught by a detent plate 30 of the respective bank of keys. As best shown in Fig. 5 each detent plate is carried by a pair of arms 31, 32 pivotally mounted at 33 to projecting ears of the U-shaped plate 23.

The detent plate 30 is so constructed that it is of the flexible type, i. e., an erroneously depressed key may be released by merely depressing another key in the same group. It is further understood that there is a detent plate 30 for each group of keys.

*Key releasing devices*

It is, of course, necessary to release the depressed keys after an operation of the machine and to this end as best shown in Fig. 5 each detent plate 30 has secured thereto a bracket plate 34 to which is pivoted at 36 a spring urged pawl 35. A coil spring 37 urges the pawl 35 counterclockwise so that a curved portion 38 normally (see Fig. 2) hooks under a right angled bar 39 which is part of the main operating member. During the initial depression of bar 39 the pawl 35 will be rocked clockwise idly until the curved portion 38 is free of the bar 39 whereupon the spring 37 will cause the pawl 35 to take the position shown in Fig. 4. When the bar 39 has been fully depressed and then returned the bar 39 will in its elevation strike the pawl 35 elevating the pawl 35 since the line of force acts through the center of the pivot 36. This will cause the rocking of the detent plate 30 about its pivot disengaging the same from the notch 29 of the depressed key releasing it for its return to normal by its spring 28. Upon continued elevation of the pawl 35 a straight edge 40 (Fig. 4) thereof will strike a stationary rod 41 and upon continued elevation of the pawl 35 by the bar 39 the pawl 35 will rock clockwise until its curved portion 38 is free of the bar 39, whereupon spring 37 will be effective to rock the pawl 35 to its normal position shown in Fig. 2.

*Key locking devices*

It is further desirable to lock the undepressed keys after a machine operation is initiated and to prevent an operation of the machine when a key is partially depressed.

For each detent plate 30 there is provided a bell crank loosely pivoted on the rod 41 consisting of an arm 42 normally engaging a related detent plate 30 and an arm 43. The arm 43 has a projection 44 and the bar 39 is adapted to pass in front of an arcuate edge of said projection, thereby locking the related detent plate 30 to prevent a depression of a key not selected for operation after a machine operation is initiated.

The projection 44 also has an arcuate edge 45 which is adapted to pass beneath the bar 39 wherever a key is being depressed and locks the bar 39 until a key is fully depressed. Hence the machine cannot be operated with a key partially depressed.

Interlocking devices for keys of a group

Figures 4, 4A:
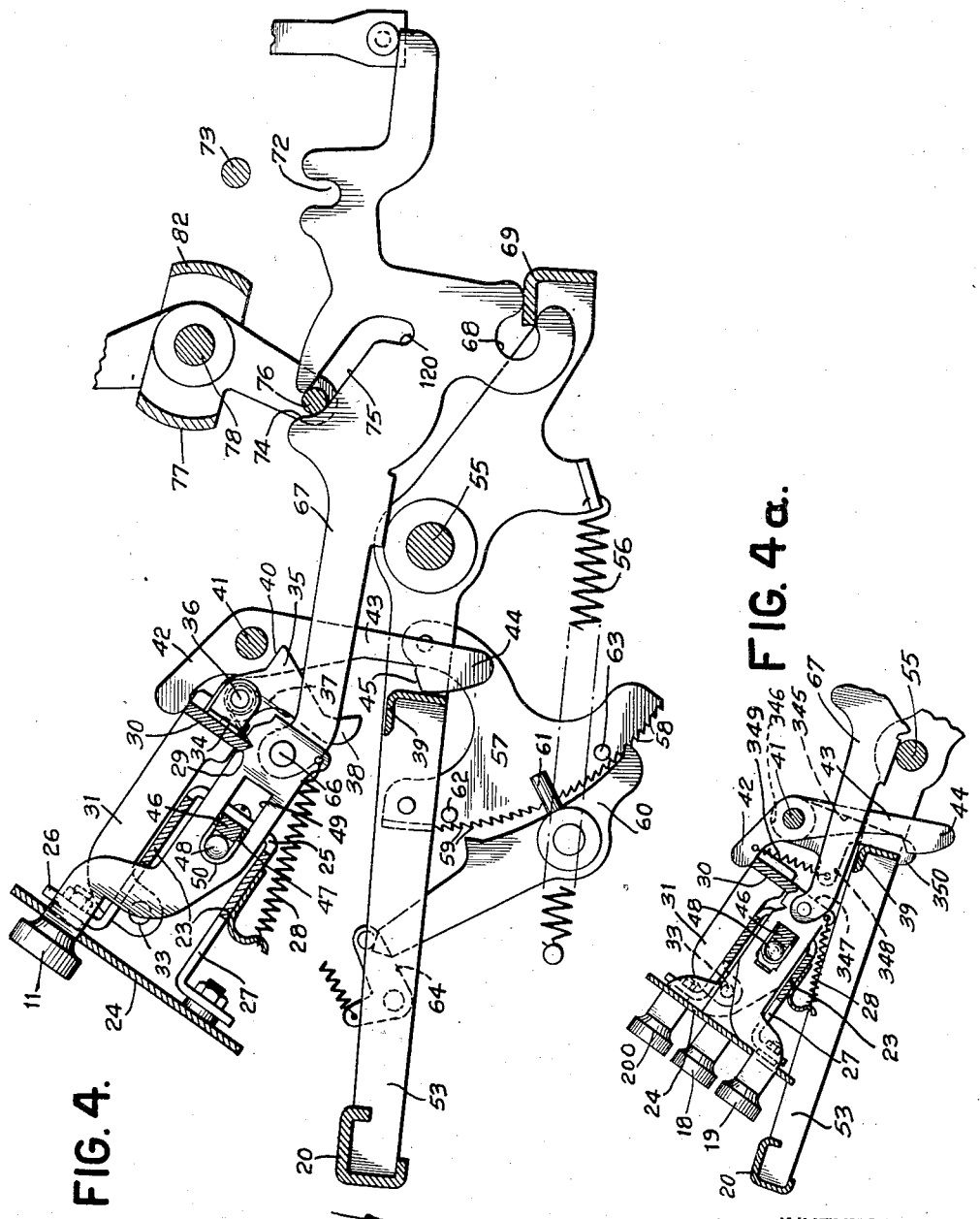
Fig. 4 is an enlarged view in side elevation showing particularly the key construction and parts of the differential mechanism shown in operated position.
Fig. 4a is a detail view showing the means which compels the operation of a clerk's key before the machine can be operated.

This mechanism is best shown in Figs. 4 and 5 and prevents the depression of more than one key in a group.

As best shown in Figs. 4 and 5 the U-shaped plate 23 has attached thereto a bar 46 to which is attached a curved plate 47 the loop of the plate 47 with the bar 46 forming a recess in which fits a group of balls 48. The stem of each key has an aperture 49 to receive these parts, as is shown in Fig. 4, and the curved plate 47 has slots 50 so as to receive a part of the key stems. A pair of bars 51 and 52 (Fig. 5) is attached to the bar 46 and plate 23 and are so positioned as to confine the group of balls 48 between ends of the bars 51 and 52 with sufficient space left so as to receive only one key stem. Obviously when a key is fully depressed its stem will enter between adjacent balls 48 crowding the others of the group sufficiently so that another key in the same group cannot be depressed. This mechanism is duplicated for the five groups of keys.

Main operating bar

The main operating bar previously referred to comprises a pair of arms 53 and 54 (Figs. 4 and 5) loosely pivoted on a stationary rod 55 and between which arms is carried the bars 20 and 39. The bar 20 is exterior of the cabinet, as is shown in Fig. 1, and is depressed manually, the arms 53 and 54 rocking about the rod 55 and against the action of a return spring 56.

Any suitable full stroke device may be provided to insure a full depression of the bar 20 before its return can be effected. In the present machine this comprises a well known form consisting of a plate 57 attached to the arm 53 and provided with wedge-shaped notches 58 and oppositely-shaped notches 59. A reversible pawl 60 cooperates alternately with the sets of notches 58 and 59 and its position is reversed when a pin 61 carried by the pawl 60 is engaged by either of the pins 62 and 63 secured to the plate 57. An impositive detent 64 holds the pawl 60 in its shifted position.

Differential mechanism

Figure 2:
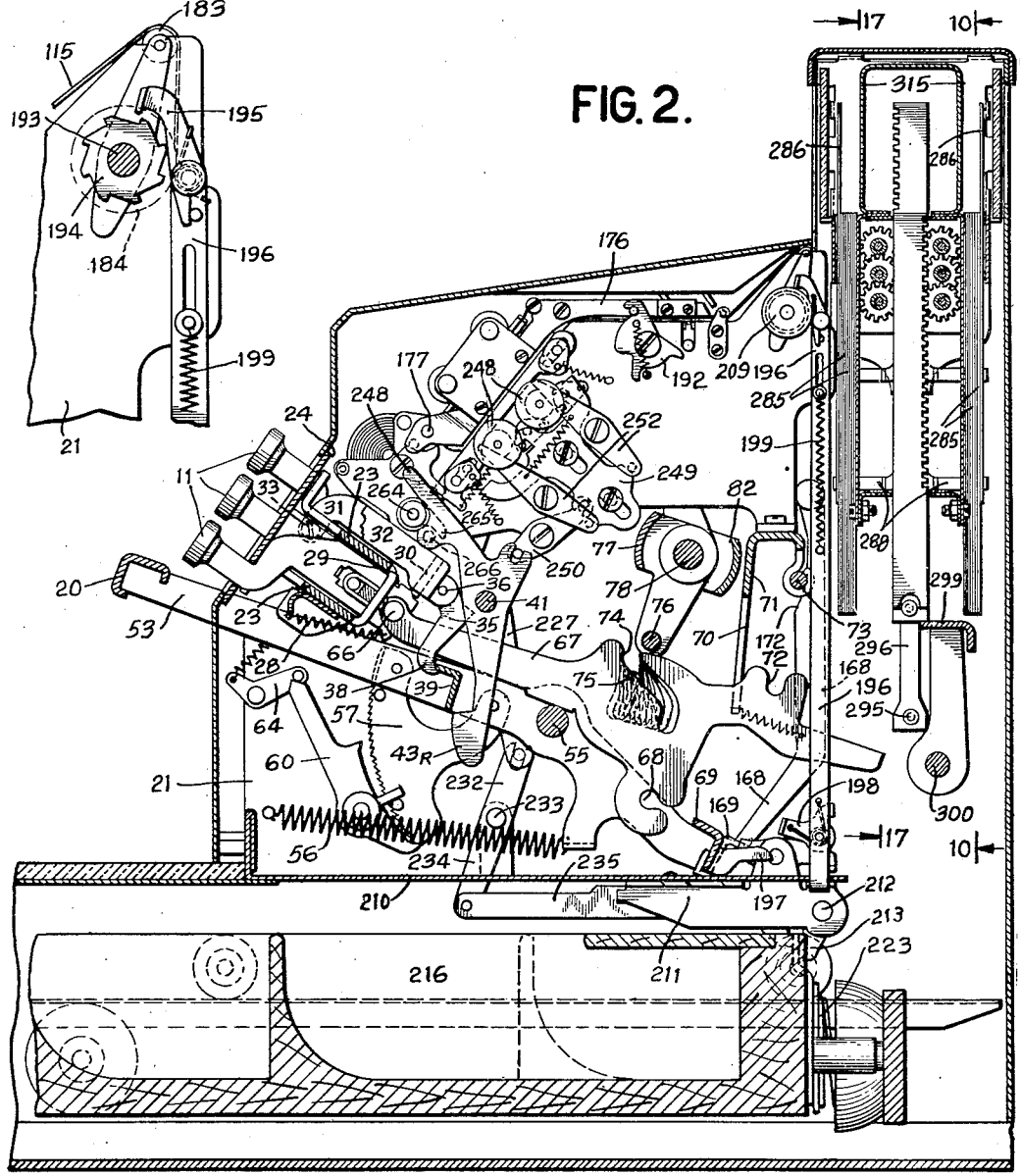
Fig. 2 is a transverse sectional view taken on the line 2—2 of Fig. 1.

As is best shown in Figs. 2 and 4 pivoted at 66 to a key stem is a related key cam 67 having a coupling notch 68 engageable with a coupling bar 69 when the associated key is depressed. The coupling bar 69 is part of the operating member and is carried by rearward extensions of the arms 53 and 54 (Fig. 5). Each group of keys has a related series of key cams 67 so that a selected one may be coupled to the coupling bar 69 and rocked individually counterclockwise by the depression of the operating member 20.

Each key cam 67 is guided at its rearmost end by slots 70 (Fig. 2) in a stationary guide plate 71 and when the selected plate 67 has been rocked to its extreme position by the bar 69 a notch 72 thereof will be received by a rod 73. The key cams 67 normally rest upon the shaft 55, as shown in Fig. 2.

When a selected key cam 67 is shifted rearwardly and held in shifted position by virtue of the locking of the related depressed key a dwell or entrance 74 of a cam slot 75 will register with a rod 76 of a differentially rockable frame. Fig. 2 shows the construction of cam slots 75 of the key cams 67 for the tens denominational group in which it will be observed that the cam slots 75 are graded so that the rod 76 may be rocked differentially when a key cam 67 is rocked and commensurate with the digital representation of the key depressed. It is obvious that only the particular key cam 67 selected will be actuated, the others of the same group remaining in normal position.

Figure 7:
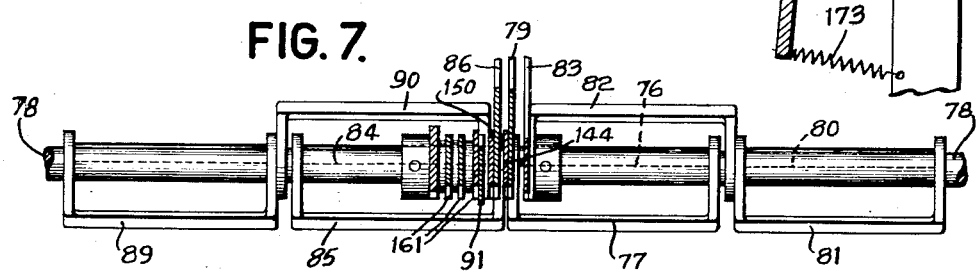
Fig. 7 is a detail view in plan showing certain of the operating connections.

As is best shown in Figs. 2 and 7 the rod 76 is carried by a U-shaped frame 77 loosely mounted on a shaft 78. Attached to a side arm of the frame 77 is a tens entering segment 79. The rod 80 for the cam plates 67 of the cents group is carried by a U-shaped frame 81 loosely mounted on the shaft 78 and to the frame 81 there is connected a bail 82 to which is attached the units entering segment 83. The rod 84 for the dollars group is carried by a U-shaped frame 85 loosely mounted on shaft 78 and to said frame there is secured a dollars entering segment 86.

Item printing mechanism

Figure 6:
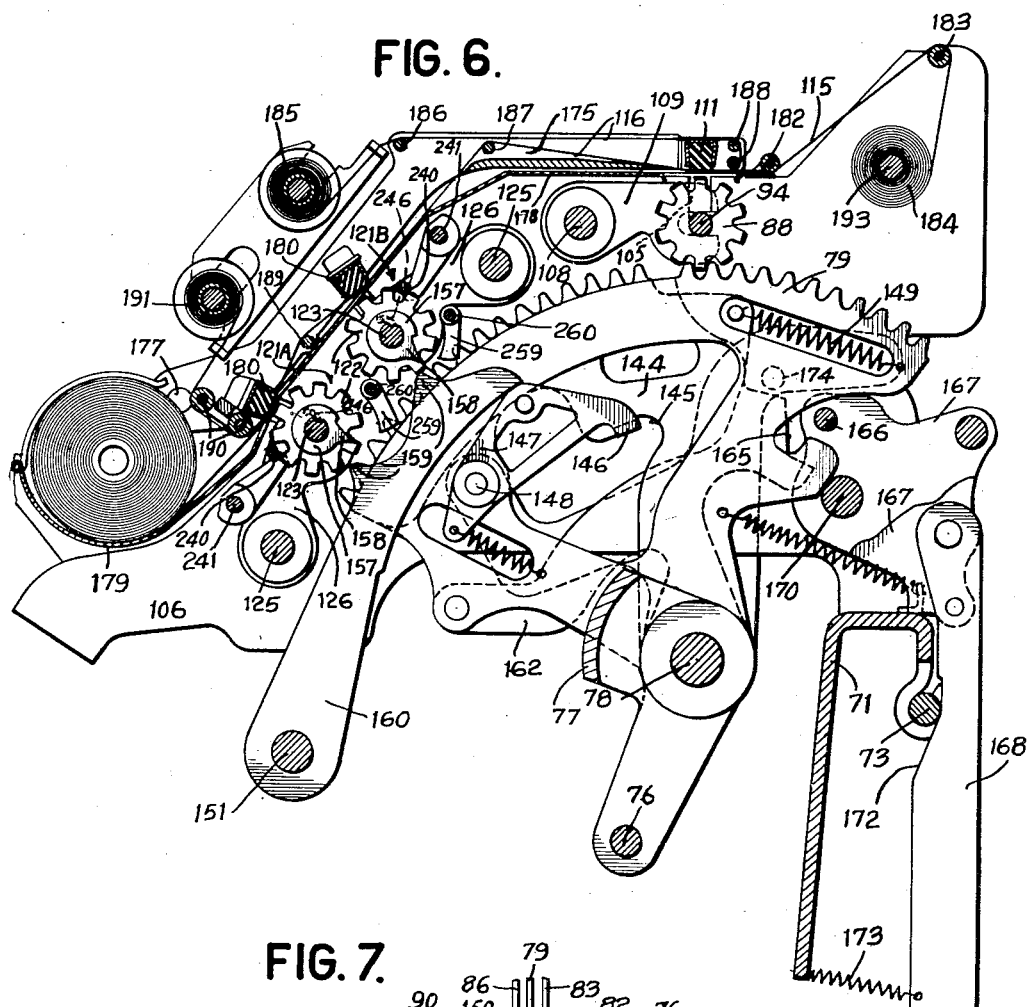
Fig. 6 is a transverse sectional view taken on the line 6—6 of Fig. 8.

Each of the segments 79, 83 and 86 is shown in Fig. 6 and is adapted to be in continuous mesh with a related item type gear wheel 88. The type wheels 8 are set according to the keys depressed in the three denominational amount groups and as will be explained hereinafter when differentially set an imprint is taken from the group of type wheels 88 and others now to be referred to.

The set of transaction keys 13—17 are adapted by means of a differential mechanism of the type previously described to rock a frame 89 (Fig. 7) and through a crossover bail 90 differentially set a segment 91 (see also Fig. 8) to set a printing gear wheel 92 having thereon printing characters representing the transaction key depressed.

It is also desirable to set a type wheel to identify the clerk entering the amount. The clerk's character printing wheel 93 (Fig. 8) is normally set to print the letter "B" but may be rocked under control of the "A" clerk's key 18 to set the "A" character to printing position. This is effected by means now to be described. The type wheel 93 is secured to the shaft 94 which carries the different type wheels. To the shaft 94 there is secured an arm 95 (Fig. 9) carrying a pin 96 which fits in a slot in the upper end of a bent lever 97, which is pivoted at 98. The other arm of the bent lever is slotted to receive a pin 99 carried by a cam plate 100.

Referring to Fig. 5 it will be seen that the "A" clerk's key 18 is adapted to shift its cam plate 67A rearwardly in the manner previously explained and by means of a pin 101 carried thereby to initially rock a related cam plate 103 which, as shown in Fig. 11, is secured to one end of a sleeve 104, the other end having secured thereto the cam plate 100.

When the cam plate 103 is rocked, the latter will rock the sleeve 104, the cam plate 103, and by the plate 100, pin 99, bent lever 97, pin 96, arm 95, shaft 94, rock the type wheel 93 to bring the "A" type to printing position.

Each of the clerk's keys 18 and 19 is adapted to cause the item printing operation in a manner now to be explained and is effected by coupling its key cam 67A or 67B to the bar 69.

From Figs. 6 and 8 it will be seen that the type wheels 88, 92 and 93 are carried by the shaft 94 which is movable in slots 105 (Fig. 9) in a pair of support frames 106 and 107 (Figs. 8 and 9).

Journalled in the support frames 106 and 107 is a shaft 108 to which is secured a pair of arms 109 which are notched for receiving the shaft 94. To the shaft 108 there is secured a spring urged arm 110 (Fig. 9) and obviously by suitably rocking the arm 110 the shaft 108 through the arms 109 will elevate shaft 94 and move the type wheels which are provided with indicia in non-reversed order.

Each of the clerk's keys is adapted to cause the operating member 20 to rock the arm 110 to effect the printing impression.

The arm 110 is provided with a pin 112 which is received by a cam slot 113 which is of a similar formation in both a cam plate 114 and the cam plate 100. In the manner previously explained when the "A" clerk's key is depressed the cam plate 67A will be coupled to the operating bar 69 and rock the cam plate 67A. The latter will cause pin 101 to enter a cam slot 102 of cam plate 103 further rocking the latter, the sleeve 104 and the cam plate 100. It is evident that the cam slot 113 therein will rock arm 110 forcing the type wheels to move a record strip 115 and an inking ribbon 116 against a platen 111 to effect an imprint upon the top face of the record strip 115 (Fig. 6) without direct contact between the type wheels and the inking ribbon 116.

When the "B" key is depressed the pin 117 (Fig. 5) carried by its cam plate 67B will be shifted to register with the cam slot in its related cam plate 118 (Figs. 9 and 11) causing it to be rocked when cam plate 67B is rocked by bar 39 and through a tube connection 119 rock the cam plate 114 which will rock arm 110 to cause the printing impression.

It is explained that for the amount key and transaction key banks near the extreme elevation of a selected key cam 67 (Fig. 4) corresponding to the extreme downward movement of the operating bar 20 the rod 76, for example, is correlated a dwell 120 in the key cam which is ineffective to further rock the rod 76. The type wheels have now been set so that no further movement thereof takes place and the cam slot 102 of the selected cam plate 103 or 118 (Fig. 9) is now effective to cause printing from the printing wheels which are now stationary. After the clerk's type wheel is set to print the "A" character, further rocking of the cam plate 100 (Fig. 9) will merely cause the pin 96 (Fig. 9) to ride out of the slot in the bent lever 97 without changing the position of the clerk's type printing wheel.

Totalizers

The machine is provided with a totalizing mechanism for adding the amounts and preferably with a pair of totalizers for selectively adding the amounts entered by the different clerks under control of their respective keys.

In Fig. 6 there is shown a pair of totalizers 121A and 121B designating the two clerk's totalizers and each comprising a set of six totalizer wheels 12 provided with raised printing characters. Each series of totalizer wheels 122 is mounted on a related shaft 123 fitting in slots 124 (Fig. 9) in the support frames 106 and 107 and the shaft 123 of each totalizer may be lowered for an entering operation guided by said slots 124. Carried by the support frames 106 and 107 is a pair of shafts 125 to each of which is secured a pair of arms 126 having open slots at their free ends for receiving a related shaft 123. This mechanism is duplicated for both totalizers but to the shaft 125 of the "A" totalizer there is secured an arm 127 (Fig. 9) and secured to the shaft 125 of the "B" totalizer there is secured an arm 128 (Fig. 9). By selectively rocking one of the arms 127 and 128 the totalizers may be selected for operation in a manner now to be set forth.

As is best shown in Figs. 8, 9 and 11 loosely pivoted upon a shaft 205 is a segment plate 129 and loosely pivoted upon the sleeve 104 is a segment plate 130 each adapted to be urged to a normal position by a related spring 131 connected thereto. The arm 128 is provided with a pin 132 adapted to fit within a cam slot 133 of the segment plate 130 so that when the segment plate 130 is rocked downwardly from its normal position to the position shown in Fig. 9 the cam slot 133 is effective upon the pin 132 so as to rock the arm 128 and lower totalizer 121B to actuating position.

Correspondingly the segment plate 129 is provided with a cam slot 134 coacting with a pin 135 secured to the arm 127 to rock arm 127 and lower the totalizer 121A to actuating position when the segment plate 129 is rocked.

The cam plate 114 (Fig. 9) is provided with an extension 136 which is adapted to first contact with a pin 137 carried by segment 130 when the "B" clerk's key is depressed. When the pin 117 engages the cam slot of its cam plate 118 the cam plate 114 is rocked further clockwise to its extreme position to cause totalizer engagement and this occurs when the main operating bar 20 has been fully depressed and the item entering actuators have been differentially positioned. The cam plate 100 is also provided with an extension 138 adapted to first engage with a pin 139 secured to the segment plate 129 and then when pin 101 engages with the cam slot 102 rock the segment plate 129 further clockwise in the manner just described to cause the totalizer engagement.

Each segment plate 129 and 130 is provided with a lug 141 adapted when the plate is rocked its greatest extent to be caught by a shoulder 142 of a spring-pressed latch arm 140 to hold the segment plate in rocked position and the selected totalizer in lowered or engaged position.

It is to be understood that in Fig. 9 the position of the parts shown is with the segment plate 130 previously rocked and with the segment plate 114 in normal position but cam plate 67A in normal position since it is assumed that the "A" clerk's key has been released after its depression. It is also to be understood that each segment plate 129 or 130 is provided with an aperture which surrounds the pin 132 or 135 of the totalizer not to be actuated so that the segment plate 129 or 130 will actuate only the arm 127 or 128 as desired.

During the return movement of the operating bar 20 the selected totalizer will be actuated in a manner now to be explained. From Fig. 8 it will be seen that the segment 83 for the cents order is provided with teeth 143 adapted to actuate the units totalizer wheels of the selected totalizer during the restoration of the segment 83 from its differential position. The segment 79 for the tens order has adjacently mounted a segment 144

(see Fig. 6) having teeth adapted to engage with the tens totalizer wheel of the selected totalizer. The segment 144 is loosely mounted on the shaft 78 and is provided with a shoulder 145 normally engaged by a lug 146 of a latch arm 147 pivoted at 148 to the segment 79. A spring 149 interconnected between the segments 79 and 144 is adapted to maintain the latching relationship so that, obviously, the segment 144 partakes of the same differential movement given to the segment 79 and also if no transfer takes place of the same restoring movement. A similar construction is provided for the hundreds order, numeral 150 (Figs. 7 and 8) designating the segment positioned adjacent the hundreds order segment 86.

Thus the segment teeth 143 and segments 144 and 150 will actuate the units, tens and hundreds order totalizer wheel of the selected totalizer during the return movement of the operating bar 20.

After the amount entry operation and when a tens transfer operation has taken place in a manner to be described the selected totalizer will be demeshed from the segments and restored to its normal position by means now to be described.

Loosely mounted on a rod 151 (Fig. 9) is an arm 152 having a bent-over lug 153 in the path of the pair of latch arms 140 and a transverse extension 152a attached to which is a pair of side arms 154 and 155 to thus form a yoke-shaped frame comprising three side arms and a bent over lug.

During the return movement of the operating member 20 the bar 39 as it is elevated engages with the side arm 152 rocking the frame clockwise and causing the lug 153 to rock the latch arms 140 thereby releasing the previously latched segment plate 129 or 130 permitting the operated segment plate 129 or 130 to return to normal so that the selected totalizer will be restored to non-actuating position.

When the operating member 20 is initially depressed the bar 39 will move away from the side arm 152 permitting the latch arms 140 to be effective when the totalizer selecting plates 129 or 130 are subsequently rocked for operation.

Totalizer throwout

It is desirable that neither totalizer be actuated when an amount is entered in the machine which does not represent a cash entry. These two types of transactions are herein preferably controlled by "Paid out" key 14 and the "Charge" key 17. The key cam 67 of each of these keys is provided with a pin 156 (Figs. 5 and 9) adapted when the cam plate 67 is shifted rearwardly to rock the related arm 154 or 155 in the plane therewith and hold the arm in rocked position since the key cam is latched in shifted position. This occurs prior to a movement of the operating bar 20 so that both of the latch arms 140 will be latched in an ineffective position. At the end of the down-stroke of the operating bar either the segment plate 129 or 130 will be rocked as previously stated but due to the latched and ineffective position of the arms 140 the detent plate 129 or 130 will be returned by its spring 131 to normal at the beginning of the up-stroke of the operating bar. At this time there will be no movement of an actuating segment in view of the dwell 120 (Fig. 4). Hence during the return movement of the segments the selected totalizer will not be actuated.

The item printing mechanism will, however, be operated so that the amount entered will be printed giving a record of the transaction.

Transfer mechanism

It is, of course, necessary to transfer a unit to a totalizer wheel of higher order when a lower order wheel passes through zero.

To this end each totalizer wheel has attached thereto a disk 157 provided with a high tens transfer tooth 158. When a lower order wheel passes through zero the high tooth 158 of the disk 157 of the lower order wheel strikes a related projection 159 of a loosely pivoted arm 160. There is an arm 160 for each totalizer wheel except the wheel of the highest denominational order. The arm 160 is in the plane of the latch arm 147 for the totalizer wheel actuating segment of the next higher order thereby unlatching said segment 144 and permitting its spring 149 to move the segment rearwardly and for an extra step until it strikes a pin 174 carried by the companion segment which sets the item type wheel.

Only the tens and dollars order have the actuating mechanism disclosed in Fig. 6, but to effect transfers for the still three higher orders, there is provided a series of segments 161 (Figs. 7 and 8), similar to the segments 144. The latch arms (similar to the latch arm 147) are however pivoted upon a shaft (concentric with pivot 148) and carried by a stationary frame plate 162, (Figs. 6 and 8). The springs 164 (Fig. 8) (similar to spring 149) of these segments 161 are attached to a stud 171 carried by the frame plate 162 and segments 161 when released for an extra step engage a stationary rod 170.

To restore those segments utilized to effect tens transfer operations the following means is employed. Each of the segments which have been released for a tens transfer operation will have an edge 165 thereof engaging with a rod 166 (Fig. 6) which is of sufficient length to coact with the six totalizer wheel actuating segments. This rod is carried by a pair of plates 167 pivoted on the stationary rod 170 comprising a frame to which is pivoted a depending pitman 168, the lower end of which rests upon a bracket plate 169 attached to the bar 69 (see Fig. 2). During the initial depression of the main operating bar 20 the elevation of the bracket plate 169 will raise the pitman 168 rocking the rod 166 to the left about the pivot 170 as shown in Fig. 6. Its coaction with the edges 165 of the segments utilized in the tens transfer operation will rock those segments until they are relatched by their respective latch arms 147.

During the elevation of the pitman a cam edge 172 (Figs. 2 and 6) thereof will coact with the rod 73 rocking the pitman 168 counterclockwise during its elevation until it is finally free of the bracket plate 169 whereupon the rod 166 and the frame carrying the rod will be returned to normal position by a spring 173 (Fig. 6).

Printing mechanism

The printing mechanism includes a frame which comprises a pair of side plates 175 and 176 (Figs. 2 and 9) connected together but spaced apart by certain cross members. The frame is pivoted about a shaft 177.

Over the type wheels and the two printing totalizers there is provided a cover plate 178 (Fig. 6) provided with a partially curved portion 179 which supports a supply roll of the paper strip 115 which passes beneath the two total-printing platens 180 carried by the printing frame for the printing totalizers 121A and 121B, beneath the platen 111 for the type wheels and carried by the printing frame, a roller 182, and over a roller 183 to the record strip winding roller 184. The cover plate 178 is suitably apertured so that the sets of printing wheels may be moved upwardly and project therethrough and force the record strip against the inking ribbon 116 which passes over the record strip but against the platen.

The printing frame carries the inking mechanism which comprises two rolls whereby the inking ribbon 116 feeds from one roll 185 over a roller 186, over the platen 111, around rollers 188, underneath the platen 111, over a roller 187, underneath the platen 180, over a roller 189, underneath the other platen 180, around rollers 190, to the other roll 191. As shown diagrammatically in Fig. 9 any suitable ink ribbon feeding and reversing mechanism may be provided and have suitable connections to the operating member for feeding the ribbon step by step and reversibly feeding it from one roll to the other.

As previously stated the printer frame is pivoted at 177 so that it may be swung around the pivot to facilitate the insertion of the record strip. When in its proper operating position the frame is latched by a spring-pressed latch member 192 (Fig. 2) thereby holding the printing platens rigid and immovable for printing operations.

Figure 3:
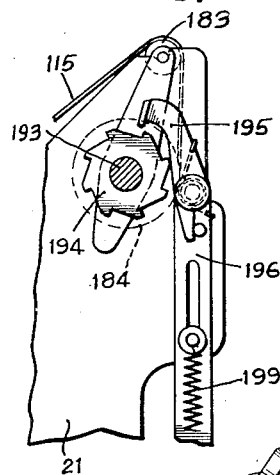
Fig. 3 is a detail view of the paper feeding mechanism.

Fig. 3 discloses a preferred means for feeding the printed record strip step by step. The shaft 193 of the record strip winding roller 184 carries a ratchet wheel 194 engageable with a spring urged pawl 195 pivotally carried by a slidably mounted operating link 196, (See Fig. 2). To the bar 69 there is secured a bracket plate having an extension 197 adapted as the bar 69 is elevated to idly rock a pawl 198 pivoted at the lower end of the link 196 and ultimately wipe by said pawl. When the extension 197 returns it strikes the pawl 198 to depress link 196 against the action of a return spring 199. Pawl 195 will now engage with the ratchet wheel 194 and rotate the record strip winding roller 184. The extension 197 will then wipe by the pawl 198 and the link 196 will thereupon return to normal by the action of the spring 199.

Autographic arrangement

Figure 1A:
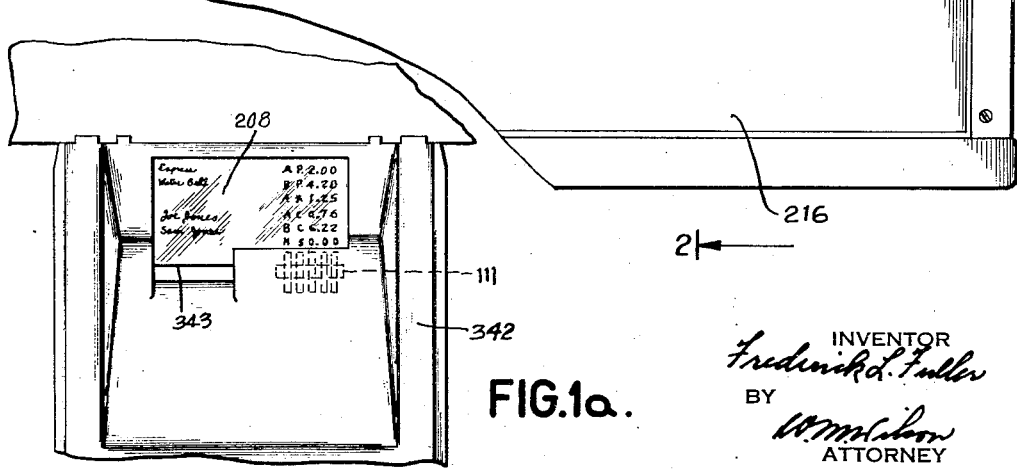
Fig. 1a is a plan view showing the arrangement that permits making autographic notations on the printed record strip.

It is frequently very desirable to make more extended entries upon the record strip than that permitted by the available printing mechanism, and in the attainment of this end, registers are usually provided with an autographic attachment. In the present machine this is provided for by employing a record strip 115 which is wider than the platen 111, as shown in Fig. 1a. The record strip passes over the cover plate 178 and a number of the printed items are visible through a glass 208 carried by the hinged cover 342. The glass is cut so as to leave a writing slot 343 by means of which the notations may be made by a pencil or pen, the cover plate 178 providing a suitable writing support.

Locking means to prevent operation of main operating bar until a clerk's or total key is depressed It is also desirable to prevent the operation of the main operating bar until either of the clerk's keys 18 or 19, or a total key 200 is depressed.

For each key which actuates this locking mechanism there is provided an arm 345 (Fig. 4a) there being three arms 345 mechanically connected together by a sleeve 346 loose on the shaft 41. When any of the three keys mentioned is depressed an edge 347 thereof will engage an extension 348 of the related arm 345 to rock the arm 345 against the tension of a spring 349 which is interconnected between one of the arms 345 and the arm 42 previously described and correlated with the bank of keys now being described. Preferably, one of the arms 345 is provided with a hook 350 normally catching beneath the bar 39 to prevent the operation of the main operating bar 20. Since the depressed key is latched in depressed position the hook 350 will be removed from the bar 39 permitting the operation of the main operating bar 20. When the key is unlatched the hook 350 will again catch over the bar 39 when it is returned to normal to lock it against a successive depression without operating a clerk's key 18 or 19 or the total key 200.

Printing totals from the printing totalizers

At the termination of the transactions made for a certain period as, for example, at the end of the day, it is desirable to know the totals standing on each of the totalizers. This is preferably ascertained by printing the totals from the printing totalizers.

The total key 200 (Figs. 1 and 5) is constructed similar to the remaining keys and when the key cam 67T (Figs. 1 and 5) of the total key 200 is shifted rearwardly a pin 202 (see Fig. 12) will register with the entrance of a cam slot 203 in a cam plate 204 secured to the shaft 205. The right end of the shaft 205 (see Fig. 11) has attached thereto a cam plate 206 provided with a pair of cam slots 207 cooperating with the studs 135 and 132 of the arms 127 and 128 respectively. Upon the depression of the main operating bar 20 the cam plate 67T will be rocked and the pin 202 in cooperation with the cam slot 203 will rock the cam plate 204, shaft 205, and cam plate 206 thus rocking both arms 127 and 128 to force both printing totalizers 121A and 121B upwardly to move the record strip 115 and inking ribbon 116 against the printing platens 180 to effect an imprint on the top face of the record strip 115 without direct contact between the type wheels and the inking ribbon 116. When the main operating bar is returned to normal the printing totalizers will assume their normal intermediate positions out of cooperation with the printing platens 180 and the actuating segments.

While the record strip 115 is fed a step in the manner previously described it is not fed sufficiently to bring the printed totals into view through the glass 208 (Fig. 1). For further record strip feeding operations to visibly read the totals the shaft 193 has secured thereto a manually operated knurled knob 209 (see Fig. 2).

The keys 18, 19 and 200 are in a single group and are interlocked by means previously described so that in this group only one clerk's key or the total key can be depressed, thereby preventing improper operations which might result in jamming certain mechanisms.

Drawer release

If desirable that a cash drawer be released for each operation of the machine in order that the amount of the transaction be placed in the cash drawer, or for the purposes of making change, paying out money, etc. This mechanism is best shown in Figs. 15 and 16.

Attached to a base plate 210 is a bracket plate 211 which provides a pivot 212 for a drawer catch 213 provided with a notch 214 which receives a plate 215 attached to the rear end of the slidably mounted cash drawer 216. The drawer catch 213 has a shoulder normally received by a lug 217 of a drawer catch release arm 218 which is pivoted at 219 to said bracket plate 211. The drawer catch release arm 218 has a lug 220 against which bears a spring-pressed trip pawl 221 also pivoted at 218. The bar 69 carries a bracket plate 222 which, upon the elevation of the bar 69 rocks the trip pawl 221 idly and ultimately passes by. Upon the return of the main operating bar 20 or the lowering of the bar 69 the bracket plate 222 strikes the top of the pawl 221 and since it rests upon the lug 220 it will rock the drawer catch release arm 218 clockwise disengaging the lug 217 from the shoulder of the drawer catch 213. A drawer spring 223 (Fig. 2) attached to the drawer will now be effective to impel the cash drawer 216 outwardly of the machine.

When the drawer is manually returned the plate 215 will rock the drawer catch 213 until it is relatched by the drawer release arm 218.

Closed drawer machine control

It is further desirable to lock the main operating bar 20 until the cash drawer 216 is returned inwardly and relatched thereby preventing successive machine operations with the cash drawer in outward position.

For this purpose there is loosely pivoted on the bracket plate 211 at 228 a hook 224 which is normally urged by a spring 225 to catch over the bracket plate 222 but such action is normally prevented by the engagement of an integral tail 226 of the hook with a lug 227 of the drawer catch 213. When the drawer catch is released as shown in Fig. 15 the hook 224 will be rocked by its spring 225 and will catch over the bracket plate 222 when the main operating bar 20 is returned to its normal position. This will prevent a successive operation of the main operating bar 20 until the cash drawer is returned inwardly and relatched.

Open drawer machine control

It is sometimes desirable to permit successive machine operations without requiring the cash drawer to be returned after each amount entering operation. This is especially necessary during busy times of the day when transactions occur rapidly.

For this purpose there is provided a control lever 229 pivoted on the rod 41 and provided with a pair of aligning notches cooperating with a pin 230 of an impositive detent 231 for holding the control lever in "Closed drawer" position or "Open drawer" position. To cause the machine to be operated in the other manner the control lever 229 is shifted one step to the left from the position shown in Fig. 16, thereby rocking an arm 232 secured to a shaft 233. To this shaft there is secured an arm 234 which is pivoted at 239 to a link 235 having a high portion 236 engageable with a pin 237 secured to an extension 238 of the hook 224. Rocking of the shaft 233 as described will rock the arm 234 and shift the plate 235 to the left sufficiently so that the high portion 236 is beneath the pin 237. If the cash drawer should now be released the hook 224 will be unable to rock over the bracket plate 222 when the main operating bar 20 is returned to normal and the machine can again be operated without requiring the cash drawer to be returned inwardly.

Release drawer machine control

It is frequently desirable to release the cash drawer without the necessity of depressing a key or operating the main operating bar 20. This, in the present machine is effected by shifting the control lever 229 to the "Release drawer" position shifting the link 235 to its extreme left position. The left end of the link is slotted to receive a pin 340 of an extension 341 of the drawer catch release arm 218. When the control lever is shifted to the "Release drawer" position the end of the slot in the link 235 will engage with the pin 340 and rock the drawer catch release arm 218, thus releasing the cash drawer for outward movement in the manner previously explained.

Due to absence of an aligning notch for this position the control lever 229 is not aligned or held in such position, except as would be done by an operator.

Locking devices

While the machine so far described is completely operative in all respects, it is desirable to utilize auxiliary locking devices to prevent improper operations.

For each totalizer there is provided a transverse locking bar 240 (Fig. 6) normally fitting within the tooth spaces of the wheels and which is a cross member of a yoke-shaped frame secured to a shaft 241. To each shaft 241 there is secured a plate 242 (Fig. 13) carrying a pin 243 and to which plate there is secured a spring 143a. The pin 243 of each plate engages a related guide slot 244 formed in a locking control plate 245. The guide slots 244 of the plate 245 receive the shafts 241 so as to guide the movement of the control plate 245.

Obviously with the parts in the position shown in Figs. 6 and 13 the locking bars 240 will lock the totalizer wheels against improper or accidental rotation because the bars 240 fit between the tooth spaces of the wheels. When a selected totalizer is depressed to engage with the segments the teeth of the totalizer wheels pass out of engagement with the related locking bar 240 releasing the wheels for rotation since the bars 240 are held by cooperation of the pins 243 and the slots 244 of the control plate 245.

Resetting totalizers

After the amounts of sales for a day or other regular intervals have been entered in the machine and the totals printed it is usually desirable to reset the totalizers so as to accumulate the amounts of sales occurring during a subsequent period. The means for accomplishing this is shown in Fig. 6 wherein it will be seen that each totalizer wheel is provided with a resetting pawl 246 and the related totalizer supporting shaft 123 is provided with resetting notches which are engageable with the ends of the resetting pawls 246. Each shaft 123 has secured thereto a reset knob 247 (Figs. 8 and 13) so that as each shaft is manually turned the notches of the shaft will engage with and pick up the variously positioned pawls and rotate the associated totalizer wheels to their zero positions. This construction of resetting mechanism is well known in the art and for this reason is only generally explained herein.

In order to release the totalizer wheels from the locking action by the bars 240 (Fig. 6) and unlock the normally locked reset knobs 247 and to define the zero position of the totalizer wheels the following described means is preferably employed.

As best shown in Fig. 13 loosely mounted on the shaft 41 is a reset control lever 248 having a connection to a slidably mounted plate 249 by an interconnecting bell crank 250, the connection being such that as the control lever is manually rocked clockwise the plate 249 will be elevated in an inclined direction.

Each reset knob 247 has secured thereto a disk 251 which is flattened so as to receive the upper arm of a bell crank 252 pivoted at 253, the lower arm having a pin 254 engageable with a high portion 255 on the edge of the locking plate 249. In this manner each reset knob 247 is normally locked, but by the elevation of the plate 249 effected by rocking the reset control lever the high portions 255 will move away from the pins 254 releasing the bell cranks 252 and unlocking the reset knobs 247.

At the same time integral projections 256 and 257 of the locking plate 249 will rock each of said plates 242 and therefore, the shafts 241 whereby the locking bars 240 (Fig. 6) will be moved to unlocking position. At this time each pin 243 (Fig. 13) will enter a recess 258 offset from the related slot 244.

Either of the reset knobs 247 can now be turned until the counterclockwise rotation of the totalizer wheels caused by turning one of the knobs 247 is terminated by the high tooth 158 of each transfer element 157 (Fig. 6) striking a related zero stop finger 259 as the wheel comes to zero. These are positioned in a manner now to be described.

The group of zero stop fingers 259 for each totalizer is carried by a related rock shaft 260 to which is secured a plate 261 (Fig. 13) and a spring 263a attached to each plate causes a pin 262 carried by the plate to engage with the upper edge of a notch 263 of the plate 249. When the plate 249 is elevated it will be apparent that the spring 263a will rock the related plate 261 clockwise and the shaft 260 in the same direction as viewed in Fig. 6 bringing the zero stop fingers 259 to zero stop control position.

As best shown in Fig. 2 the reset control lever 248 has a lower integral projection 43R similar to the projection 43 previously described and shown in Fig. 4. The purpose of projection 43R is to interlock the main operating bar 20 and reset control lever 248 so that the operation of one will lock out the other, in the manner previously described.

When the reset control lever 248 is restored to normal the parts will be in the position shown in Fig. 13 and the totalizer wheels and reset knobs 247 will be again locked and zero stop fingers 259 will be moved out of locking position, and the locking bars 240 will be moved into locking position, as shown in Fig. 6.

Single lock control device

As is best shown in Figs. 1 and 5, a lock 201 is provided and the key of this lock is usually retained by the proprietor or other authorized person for controlling various functions of the machine.

By the rotation of the cylinder of a well known form of lock by an inserted key, a locking plate 267 (Fig. 5) attached to the cylinder is rocked to withdraw a lug 268 from engagement with a portion of the total key 200 thereby unlocking the latter to permit the printing of totals.

A pin 269 (Figs. 5 and 16) carried by said cylinder is adapted to be moved out of cooperation with a lug of a bell crank 270 attached to a shaft 264. To the shaft 264 there is secured an arm 271 having a lug 272 overlying the upper edge of the impositive detent 231. With parts shown in Fig. 16, it is evident that pin 269 locks the arm 271 against any movement which would be effected by an attempt to shift the control lever 229. A withdrawal of the pin 269 out of cooperation with the arm 270 by the rotation of the key controlled cylinder will free the arm 271 for movement as well as the shaft 264 to permit the control lever 229 to be adjusted.

Referring to Fig. 13, it will be seen that the shaft 264 has secured thereto an arm 265 cooperating with a pin 266 carried by the reset control lever 248 and since shaft 264 is locked by the normal cooperation of the pin 269 (Fig. 16) with the arm 270 the reset control lever is normally locked. By unlocking the shaft 264 by the key of the lock 201 the reset control lever 248 will be unlocked to permit it to be moved rearwardly to effect the functions previously described.

Hence, the person having the key of the lock 201 can print totals from the printing totalizers, reset the totalizers, change the manner of machine operation from either closed drawer or open drawer, or release the cash drawer independent of a machine operation.

It is also explained that the reset control lever 248 and the control lever 229 are so positioned that access to each may be had by elevating the hinged cover 342 so that while access may be had by unauthorized persons they can be operated only when the lock 201 is unlocked.

Totalizer wheel locking means controlled by platen frame

It occasionally happens that the supply of record strip paper runs out when the proprietor is absent and for this reason a clerk should be permitted to insert a new supply.

Access to the printer for this purpose is gained by raising the hinged lid 342 (Fig. 1) of the cabinet which will give access to the platen carrying frame (Fig. 6) and permit it to be raised to insert the record strip. Obviously, its elevation would also carry the inking ribbon away from the cover plate 178 and permit a clerk to have access to the totalizer wheels 122 through the apertures in the cover plate 178.

A clerk, if dishonest, and if not otherwise prevented could manually rock one of the plates 242 (Fig. 13) of a totalizer since it is is free to be rocked and accessible withdrawing the locking bar 240 (Fig. 6) from the related totalizer wheels. By his finger or an implement a dishonest clerk could rotate the totalizer wheels to represent an improper total. Such fraudulent operations are to be guarded against and to prevent them in the present machine the following locking means is provided.

The side plate 176 (Fig. 13) is provided with an extension 273 carrying a pin 274 which is at the left of the pivot 177 of the platen frame. The pin 274 is in cooperation with a cam extension 275 of an arm 276 pivoted at 277 and bearing against a lug 278 of the control plate 245. When the platen carrying frame is elevated the pin 274 cooperating with the cam edge of the cam extension 275 will rock the arm 276 clockwise and shift the control plate 245 to the left thus causing the pins 243 to be out of cooperation with the recesses 258 and into cooperation with the extreme right ends of the guide slots 244. This will firmly lock the plates 242 and prevent the improper operations just described.

Indicating mechanism

It is also desirable to provide the machine with an indicating mechanism which will exhibit the amount of each transaction, the type of transaction, and the clerk making the sale. This mechanism is best shown in Figs. 2, 5, 10, 14, 17, 18 and 19. The indicating mechanism for the most part is carried by two side plates 280 and 281 (Fig. 18) which are attached to the side frames of the machine. These side plates are connected together at the top by a cross plate of a bracket 282 and the side plates 280 and 281 carry transverse brackets 283 and 284.

The plates 280 and 281 carry various groups of indicators and Fig. 19 will be referred to as an example of the construction of the indicating mechanism.

The indicators are of the flat tablet type and each comprises a tablet 285 having an upper indicia bearing portion 286 and a lower slotted portion 287. Each indicator has an aperture 289 adapted to receive an indicator elevating member or finger 288. For each amount group there is, in one set, of course, nine indicator tablets 285 and each tablet has a related elevating member or finger 288. These fingers are preferably all the same length and to have the finger 288 cooperate with the aperture 289 of the "1" tablet, said finger must project through the other eight tablets of the related set. To permit this and still prevent the finger 288 from elevating unwanted tablets the latter are provided with slots, the slot 290 designating the slot in the "2" indicator tablet and other tablets so that the finger 288 can pass through and be elevated without raising undesired indicator tablets.

To confine the sets of tablets against the side plates 280 and 281 there is provided as shown in Fig. 19 for one set two sets of headed screws 291 and 292 and which also guide the tablets in their elevation. When a previously elevated tablet is released it will drop to normal position by virtue of its own weight.

Considering, now the manner in which each group of amount keys selectively elevate the indicator tablets of the related set reference will be made to the dollars bank of keys and the related set of indicators 293 shown in Fig. 18 and visible from the front of the machine.

It will be recalled that the key cam 67 of a key is shifted to the rear when the related key is depressed thereby moving a finger 294 (Fig. 18) thereof beneath a stud 295 of the related indicator elevating rack slide of the dollars group of rack slides 296 (Fig. 17).

The rack slides 296 are slidably mounted at their lower ends by slots 297 in the bracket plates 283 and 284 and at their upper ends project through and are guided by slots in the cross plate of the bracket 282 or the overturned portions of the side plates 280 and 281. The finger or indicator elevating member 288 previously referred to comprises a plate riveted at 298 to the related rack slide 296.

Obviously when, for example, the cam plate 67 related to the $9 key is elevated the rack slide designated 296-$9 will be elevated and its finger designated 288₉ in Fig. 17 will be raised to the dotted line position (Fig. 18) raising the $9 indicator of the front set, as shown by dotted lines in Fig. 18.

Obviously there must be provided means to hold the tablet in elevated position and this is effected for all the rack slides of all groups which are elevated by key cams 67 by a spring-pressed bail 299 secured to a shaft 300. A cam edge 301 at the lower part of each rack slide 296 cams the bail 299 rearwardly and ultimately will overlie the bail 299. When the key cam 67 is restored the rack slide will drop slightly until the rack slide 296 rests on the bail 299, as is shown in Fig. 2, holding the tablet in elevated position where it can be read.

In a similar manner the group of rack slides 302 (Fig. 17) for the dimes bank will elevate the selected tablets of a dimes set of indicators which are visible from the front of the machine and also the group of rack slides 303F for the cents bank will elevate the selected tablets of a cents set of indicators which are visible from the front of the machine.

It is, however, desirable to provide an indicator setting readable from the back of the machine and to this end there is provided three sets of amount indicating tablets readable from the back of the machine and in correct numerical order, providing what is known as "commercial indication." The set of indicators for the cents group is designated by numeral 304 in Fig. 18 and from this it will be seen that the front and back sets are similar in construction.

Since the amount entered was $9 in the example assumed it is obviously necessary to select a $9 indicator of the back set of dollars' indicators. Referring to Figs. 17 and 18 it will be seen that the rack slide designated 296—$9 is provided with rack teeth 305 meshing with a pinion 306 attached to a shaft 307 which carries at the other end a pinion 308 in mesh with rack teeth 309 of a rack slide designated 296—$9B. This rack slide is also provided with a finger (not shown) but like finger 288 (Fig. 18) except that it projects through the back set of dollars' indicators and will elevate the $9 indicator of the back set. Since the rack slide 296—$9 is held elevated it will hold the rack slide 296—$9B elevated to hold the indicator of the back set in elevated position.

A similar arrangement is provided between the remaining rack slides of the front group 296F of the dollars indicator at the front and the rack slides of the back group 296B for the dollars indicators at the back, as shown in Fig. 17. The tube connections are arranged in three sets, 310, 311, 312 and comprises for each set; a shaft with pinions at each end; a tube overlying the shaft and provided with pinions at each end, and a second tube overlying the first tube and carrying pinions at each end. These connections are carried by the bracket plate 282.

Hence, the exhibition of the dollars amount will be effected for each side of the machine. In Fig. 10 there is also shown the similar connections carried by the bracket plate 282 between the rack slides 303F for the front set of cents indicators and the rack slides 303B for the back set of cents indicators, so that the cents amount can be exhibited on both sides of the machine and in proper numerical order.

The cross connections between the two sets of front and back indicators are only necessary for the cents and dollars. For the dimes the set of rack slides 302 is not provided with any rack teeth but each carries oppositely projecting fingers 288 (see Figs. 10 and 17), one finger projecting through the front set of dimes indicators (Fig. 17) and the other finger through the back set (Fig. 10) of dimes indicators. This will cause a pair of indicators representing the same "tens" amount to indicate similar amounts at the front and back.

A somewhat similar tablet selecting arrangement described for the "dimes" indicators is provided for the transaction set of indicator elevating slides 313, and the "B" indicator slide 314 (Figs. 5 and 17).

Attached to the plates 280 and 281 is U-shaped indicator plate 315 carrying the characters shown in Fig. 17. The pair of "B" indicators will change the normal clerk's indication "A" to "B" on both sides of the machine. A pair of selected transaction indicators will change the normal indication "Cash" to indicate some other type of transaction on both sides of the machine. The "$" sign on the plate 315 will only be concealed when the dollars' indication is necessary. The two zeros on the plate 315 will fill in the zeros when only a dollars' indicator is exhibited.

As best shown in Fig. 18 the various rack slides, cross connecting means, etc., are located between the plates 280 and 281 and concealed from view while the projected rack slides pass within the U-shaped plate 315 and are also concealed from view.

It is necessary, of course, to release the indicator tablets previously elevated and this is effected by the following described means.

As best shown in Figs. 5 and 14 the arm 53 has a pin and slot connection 316 to an extension 317 of an arm 318 pivoted on the shaft 41. Pivoted at 319 to the arm 318 is an irregular shaped pawl 320 and connected between a stud 321 carried by a tail 322 of the pawl and a stud attached to the arm 318 is a spring 323. In the normal position of the parts the stud 321 rests upon the upper edge of a bracket 324 the spring 323 being above the pivot 319 of the pawl so that the pawl is rocked to cause a cut-out portion 325 to engage a stud 326 carried by a link 327. The stud 326 receives a slot formed in the end of the arm 318.

At the initial operation of the machine the arm 318 is rocked by the arm 53 elevating the pawl 320 until a cam edge 328 thereof engages with a pin 329 carried by a side arm 330 of the bail 299. Further elevation of the arm 318 will cause the cam edge 328 to rock the bail 299 counterclockwise (Fig. 14) to release the previously elevated indicators. Further elevation of arm 318 will cause the pawl 320 to pass by the bail 299. When the arm 318 is restored a tail 331 of the pawl 320 will catch over the pin 329 but the pawl will merely rock idly in a clockwise direction until it is free of said pin, after which its pin 321 will engage with the bracket 324 and position the pawl 320 as shown in Fig. 14.

*Flash mechanism*

It is desirable to conceal the indicators while they are being elevated and for this purpose a flash mechanism is utilized and which is well known in the art. There is provided a link 327 (Fig. 5) at the left end, and a similar link 332 at the right end which has a pin and slot connection 54 similar to the arm 53 to that shown in Fig. 14 between the link 327 and the arm 53, and each carries at its upper end a Y-shaped piece 333 (Fig. 18) having arms 334 and 335 projecting through slots 336 (Fig. 19) in the plates 280 and 281. Each pair of arms 334 and 335 carries a flash indicator plate 337 and both pass up in front of all the sets of indicators, both front and back. Each indicator plate 337 preferably carries the words "Not registered" and by this arrangement the raised indicator tablets cannot be viewed until the flash indicator is lowered.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a cash register, the combination with a differentially positionable actuating frame comprising a transverse bar, of a plurality of pivoted cam plates having graduated cam slots normally out of cooperation with said frame, a common operating member for rocking said cam plates, and a plurality of depressible keys connected to said cam plates at their pivots for coupling the selected cam plate with the common operating member and concurrently correlating the cam slot of the cam plate with said transverse bar.

2. In a cash register, the combination with a plurality of depressible keys, of a plurality of cam levers having open graduated slots and pivoted to said keys, a rockable common operating member, each of said keys when depressed causing the coupling of the related lever to said operating member at the free ends of said levers, and a differentially positionable actuating frame comprising a bar engageable with the cam slots and positioned intermediate the pivot of said cam levers and the point of coupling of said cam levers with said operating member.

3. In a cash register, the combination with a plurality of amount controlling keys depressible prior to an operation of the machine, of a plurality of rockable and shiftable plates pivotally connected to said keys to be shifted thereby and having graduated cam portions, resilient means for urging said plates to be restored from their shifted positions, a differentially positionable frame actuated by said cam portions, means for holding against the action of said resilient means the selected plate shifted by the key in shifted position for operating said frame by its cam portion, a common operating member for rocking the shifted cam plate about its pivot, thereby rocking said frame by the cam portion, and means operated by said common operating member at the completion of the operation of said member for disabling said holding means for enabling said resilient means to restore the rocked cam plate from its shifted position.

4. In a cash register, the combination with a differentially positionable frame, of a plurality of depressible amount keys, a key coupler, means for rocking said key coupler, a plurality of shiftable and rockable cam plates having graduated cam portions shiftable into cooperation with said frame, and means whereby each cam plate is shifted by the related key for coupling with said coupler and into said cooperating position.

5. In a cash register, the combination with a plurality of depressible keys, of a differentially rockable frame, a common operating member, a plurality of cam plates having cam bearing portions and coupling portions at the free ends of said plates and shiftable into position for actuating said frame and into coupling position with said operating member, and means pivotally connecting said keys and said cam plates for causing the cam plate to be shifted by the depression of a key into frame actuating position and for coupling the cam plate to said operating member.

6. In a cash register, the combination with a differential rockable frame, of actuating members for said frame, each member comprising a manually operable key portion and a pivotally connected cam plate, said plates having graduated cam portions for actuating said frame, and means for rocking a cam plate selected by the depression of a related key about its pivotal connection to said key, to cause its cam portion to actuate said frame.

7. In a cash register, the combination with a plurality of depressible amount controlling keys, of a plurality of cam plates pivotally connected to said keys and having graduated cam portions, a differentially positionable frame cooperable with said cam portions for operation thereby, a normally ineffective operating member for rocking said cam plates about their pivots, said cam plates having coupling means for connecting them to said operating member effected by the depression of the keys.

FREDERICK L. FULLER.